United States Patent [19]

McDougald

[11] Patent Number: 5,554,281
[45] Date of Patent: Sep. 10, 1996

[54] TRAVELING BRIDGE FILTER SYSTEM AND ASSOCIATED UNDERDRAIN

[75] Inventor: Mack D. McDougald, Ochlocknee, Ga.

[73] Assignee: Davis Water & Waste Industries, Inc., Thomasville, Ga.

[21] Appl. No.: 379,112

[22] Filed: Jan. 27, 1995

Related U.S. Application Data

[63] Continuation of Ser. No. 68,165, May 28, 1993, abandoned.

[51] Int. Cl.$^6$ ................................................. B01D 24/46
[52] U.S. Cl. .......................... 210/273; 210/275; 210/279; 210/291; 210/271
[58] Field of Search ................................. 210/271, 273, 210/275, 279, 291, 293, 264, 272, 274, 275

[56] References Cited

U.S. PATENT DOCUMENTS

| | | | |
|---|---|---|---|
| Re. 23,009 | 6/1948 | Camp | 219/149 |
| 607,155 | 7/1898 | Bleakley et al. | 210/279 |
| 647,780 | 4/1900 | Wilson | 210/279 |
| 668,127 | 2/1901 | Hodkinson | 210/271 |
| 772,581 | 3/1903 | Hodkinson | 210/271 |
| 1,383,384 | 7/1921 | Brown | 210/176 |
| 1,408,228 | 2/1922 | Sirch | 210/279 |
| 1,604,379 | 10/1926 | Blaisdell | 210/273 |
| 1,718,767 | 6/1929 | Wade | 210/271 |
| 2,156,291 | 5/1939 | Hurt | 210/129 |
| 2,194,071 | 3/1940 | Hine | 210/128 |
| 2,217,689 | 10/1940 | Laughlin | 210/128 |
| 2,229,894 | 1/1941 | Kayser | 210/128 |
| 2,235,227 | 3/1941 | Lose, Jr. | 210/128 |
| 2,263,964 | 11/1941 | Camp | 210/148 |
| 2,302,449 | 11/1942 | Laughlin | 210/275 |
| 2,302,450 | 11/1942 | Laughlin | 210/293 |
| 2,311,594 | 2/1943 | Lose, Jr. | 210/128 |
| 2,396,769 | 3/1946 | Asch | 210/128 |
| 2,442,594 | 6/1948 | Fraser | 210/128 |

(List continued on next page.)

OTHER PUBLICATIONS

SYBRON/Leopold Catalog No. F–977, "Dual–Lateral Air/Water Filter Underdrain" (undated).
Drawings entitled "Filter", Leopold—A Mueller Company, undated.
Drawings entitled "Carriage Filter", Leopold—A Mueller Company, dated Oct. 1978 to Aug. 4, 1989.
"ENELCO® Water Treatment Systems . . . ", Environmental Elements Corporation, 1979.
"ENELCO® Engineered Polymer Polyethylene Under Drain Support Plates", Environmental Elements Corporation, 1979.
"Filtros Product Bulletin", No. UP–568, Electro Refractories & Abrasives, division of Ferro Corporation.

*Primary Examiner*—Cynthia L. Nessler
*Attorney, Agent, or Firm*—Nixon & Vanderhye P.C.

[57] ABSTRACT

A travelling bridge filtration unit includes a tank having a bottom wall, a pair of side walls and a pair of end walls arranged to provide a rectangular tank with an open top. An interior partition in the tank extends lengthwise between the pair of end walls forms a filtrate channel between the interior partition and one of the side walls, and a filter basin between the interior partition and the other of the pair of side walls, with a bed of filter media located in the filter basin. A travelling bridge is mounted on the tank for movement therealong in a lengthwise direction, the travelling bridge supporting a backwash pump and a backwash hood for movement across the filter basin in close proximity to the filter bed. A plurality of structural underdrain headers extend between the interior partition and the other of the pair of side walls, the headers having closed ends adjacent one of the side walls, and open ends extending through the interior partition in communication with the filtrate channel. The underdrain headers each further include a plurality of apertures formed along the length thereof so that filtrate flowing down through the filter media can be discharged via the headers to the filtrate channel, and so that successive portions of the bed of filter media can be backwashed with filtrate flowing into the bed via the headers and then up through the filter media to be removed via the backwash hood.

21 Claims, 3 Drawing Sheets

U.S. PATENT DOCUMENTS

| | | | |
|---|---|---|---|
| 2,459,353 | 1/1949 | Woods | 210/279 |
| 3,049,238 | 8/1962 | Whitlock | 210/191 |
| 3,178,026 | 4/1965 | Christy | 210/293 |
| 3,239,061 | 3/1966 | Horning et al. | 210/793 |
| 3,247,971 | 4/1966 | Kastler | 210/291 |
| 3,322,284 | 5/1967 | Moore | 210/279 |
| 3,552,572 | 1/1971 | Lehmann | 210/271 |
| 3,984,326 | 10/1976 | Bendel | 210/264 |
| 4,032,443 | 6/1977 | Ross | 210/82 |
| 4,082,664 | 4/1978 | Lindstol | 210/271 |
| 4,133,766 | 1/1979 | Adie | 210/275 |
| 4,152,265 | 5/1979 | Meyers | 210/273 |
| 4,152,266 | 5/1979 | Lazovsky et al. | 210/291 |
| 4,211,656 | 7/1980 | Cochrane | 210/149 |
| 4,379,050 | 4/1983 | Hess et al. | 210/151 |
| 4,450,077 | 5/1984 | Black et al. | 210/275 |
| 4,454,034 | 6/1984 | Astrom et al. | 210/275 |
| 4,486,307 | 12/1984 | Weiler | 210/275 |
| 4,540,487 | 9/1985 | Johnson et al. | 210/271 |
| 4,617,131 | 10/1986 | Walker | 210/794 |
| 4,624,783 | 11/1986 | Black et al. | 210/271 |
| 4,661,258 | 4/1987 | Phillips | 210/661 |
| 4,746,431 | 5/1988 | Gibaud et al. | 210/274 |
| 4,753,726 | 6/1988 | Suchanek | 210/232 |
| 4,764,288 | 8/1988 | Walker et al. | 210/793 |
| 4,859,330 | 8/1989 | Pauwels | 210/274 |
| 4,957,631 | 9/1990 | Pauwels | 210/264 |
| 4,988,439 | 1/1991 | Medders, II | 210/274 |
| 5,066,393 | 11/1991 | Padera et al. | 210/136 |
| 5,078,873 | 1/1992 | Black et al. | 210/264 |
| 5,089,117 | 2/1992 | Nichols | 210/264 |
| 5,108,627 | 4/1992 | Berkebile et al. | 210/793 |
| 5,118,419 | 6/1992 | Evans et al. | 210/291 |
| 5,156,738 | 10/1992 | Maxson | 210/274 |
| 5,160,614 | 11/1992 | Brown | 210/275 |

TRAVELING BRIDGE FILTER SYSTEM AND ASSOCIATED UNDERDRAIN

This is a continuation of application Ser. No. 08/068,165, filed May 28, 1993, now abandoned.

This invention relates to travelling bridge filtration systems and, more specifically, to a unique backwash system for a travelling bridge filtration system.

BACKGROUND AND SUMMARY OF THE INVENTION

It is well known in the art to utilize filtration tanks divided into a plurality of filter cells, one adjacent the other, and all containing a multi-layer or single layer arrangement of granular filter media such as sand, gravel and the like. In downward flow filtration systems of this type, water or other liquid containing suspended solid particles is introduced into the filtration tank from above, and clarified water is drawn off from a chamber either beneath or adjacent the individual filter cells. During downward flow through the individual cells, particulate matter is entrapped within the layer or layers of granular filter media, but eventually, the particulate matter clogs the filter media, thereby reducing the filtering capability of the system. Thus, there is a need for a periodic cleaning of the filter cells. It is also known to maintain such units in continuous operation during cleaning by the use of travelling bridge devices which move from one filter cell to the next, cleaning individual cells while permitting the filtration process to continue in the remaining cells.

Examples of travelling bridge apparatus of this type may be found in U.S. Pat. Nos. 5,089,117; 4,988,439; 4,957,631; 4,859,330; 4,764,288; 4,617,131; 4,540,487; 4,486,307; 4,133,766; 3,984,326; 2,235,227; and 2,302,449. Typically, travelling bridge systems include an overhead carriage, movable along tracks, guideways or the like, which carry a backwash hood which is either successively engageable with the open upper end of each filter cell or passes over the filter bed in close proximity to the media surface. For a downflow type filter, water or other treatment liquid is generally introduced by a backwash pump into the cell from below in a counterflow arrangement to the normal filtering direction. The backwash hood typically includes a suction head (i.e., a waste water pump) for drawing out fluid and debris forced to the surface of the filter cell as a result of the backwash. As the backwash of individual cells is completed, the travelling bridge moves the backwash hood to the next adjacent cell.

Typically, the filter media in each cell is supported above the bottom wall or floor of the tank by an underdrain structure which, in most existing designs, comprises fused porous polyethylene plates, or porous alumina oxide plates. The filter media is placed directly on the underdrain plates which, in turn, are supported on horizontal shelves on adjacent, vertical filter cell dividers. An L-shaped angle bracket or other retaining device is bolted through the cell dividers snugly on top of the underdrain plate to act as a means of capturing the underdrain plate. This is necessary because of the uplift exerted when flow is reversed through the underdrain plate by the backwash pump during a backwash cycle. There are, however, a number of problems with this type of underdrain:

(1) Fouling of the underdrain plates from a) microorganisms growing in the pores and on the surface of the plates; b) oils and grease present in the feed flow; and c) suspended solids which penetrate the filter media during dosing or which are pushed into the porous plates in reverse during backwash. All of these eventually lead to irreversible fouling, resulting in poor filter performance and requiring underdrain replacement. Fouling occurs from these phenomena because the pore size openings in the underdrain are very small, primarily because the underdrain plates are manufactured by compressing and fusing beads together to form a ¾ inch to 1 inch thick plates.

(2) Filter media loss is a common phenomena with existing porous underdrains because of the sealing methods used during installation. In the case of porous polyethylene plates, leakage at the end of the plate sections and at the point where the plates contact the basin walls is common because thermal expansion of the plates is quite high. Even regular expansion and contraction, due to temperature fluctuation, serve to push the sealing material out of the joints, allowing the filter media to leak into the underdrain plenum. Aluminum oxide underdrain plates are thermally stable, but are manufactured in 12 inch long sections which must be sealed at each joint with a flexible sealer. Compounding this problem is the fact that the plates are assembled with square butt joints, which make them even more difficult to seal. Moreover, underdrain sealer degradation compounds both of the above problems since the sealers have polyethylene bases and often soften over time due to submergence and chemical attack.

(3) Strength of the underdrain plates and their ability to support not only the weight of the filter media, but foot traffic during installation and uplift caused by the backwash pump as well, dictates a practical cell width of 12 inches. Thus, installation of the underdrain plates is critical to system operation due to the factors outlined under media loss. Workmen performing installation must be careful to properly seal the plates. Care must also be exercised to prevent the sealer from getting onto the surface of the underdrain to prevent blinding.

(4) Uneven distribution of backwash flow is an inherent problem with porous underdrains because of manufacturing tolerances which are typically + or − 25% permeability. Add to this the problems of fouling as described in item 1 above and the problem becomes significantly more acute.

Existing underdrain designs require distinct structural cell divider walls for two basic purposes: first, to provide a structural support for the underdrain plate as noted above, and second, to form a distinct sealed plenum for directing backwash water flow. In order to achieve these ends, it becomes necessary to seal the plenum and underdrain plates to prevent media loss, and to insure that backwash flow will pass upwards through the underdrain plate. Filter cell dividers must also be sealed to the base or floor and walls to prevent backwash water short circuiting, since the individual plenums are pressure zones during backwash. To effect such a seal, a special installation hardware is cast into or attached to the basin walls for installation of the cell dividers. This requires special forming of concrete basins which must be constructed to close tolerances so that the cell dividers fit correctly. In addition, leveling strips must be installed along the basin floor for levelling the cell dividers. The cell dividers must be anchored to these leveling strips, and then the entire floor area must be grouted with cement grout to seal the cell dividers to the floor.

While current design practices rely on the underdrain to provide uniform hydraulic distribution of both dosing and backwash flow, given the problems discussed above it is apparent that present underdrain systems are not completely satisfactory.

The proposed travelling bridge filtration system in accordance with this invention utilizes a new underdrain design including a plurality of pipe headers for dosing and backwash distribution as well as media support. Each pipe header is equipped with orifices or slots which are sized and spaced in accordance with hydraulic design and desired media grain size retention.

The underdrain pipe headers are not attached to the vertical cell dividers, but are self-supporting structures in and of themselves. Sealing to prevent media loss is not required as there are no seams or joints in the headers. Moreover, biological fouling is minimized since the orifice or slot size is substantially greater than the porous underdrains.

In addition, the underdrain pipe headers in accordance with this invention are much stronger than porous plates since they are fabricated from structural members. Installation is also simplified in that there are no hold-down angles to install nor joint sealers to apply.

In terms of performance, hydraulic distribution is superior to conventional porous plates since the design is based on standard engineering calculations, with machine placed orifices or slots and resultant machine precision tolerances. In addition, the reduced potential for fouling provides superior overall hydraulic characteristics.

Given a situation where a conventional porous underdrain and the pipe header underdrain of this invention were to foul, the ability to clean the underdrain is vastly improved with the pipe header of this invention. The porous underdrain, by reason of its formation from compressed fused beads, has a very tortuous path of flow through the thickness of the plate. When this path of flow becomes blocked, cleaning becomes difficult. On the other hand, pipe headers in accordance with this invention have a straight path through the wall of the pipe and can be cleaned by high pressure spray through the slots or orifices, or through the open ends of the headers in the adjacent backwash channel.

In accordance with the present invention, there is no need for distinct plenums as defined by individual cell dividers. Thus, cell dividers in accordance with this invention, if used, only serve to help direct the backwash flow. The sealing of the cell dividers to the floor or wall is not required, and no special brackets need be cast into the concrete basin walls. In addition, no leveling strips are required and no grouting or other sealing measures are necessary. Cell dividers, if used, can simply bolt in place since they are non-structural members. In accordance with an alternative and preferred arrangement, the cell dividers may be completely omitted from the present design. In other words, since cell dividers are utilized primarily to support the underdrain and to provide a plenum area for backwash, elimination of these functions by the proposed design also does away with the need for cell dividers per se.

In a first exemplary embodiment of the invention, a travelling bridge filtration unit is arranged as a single filter cell, with no cell dividers as found in conventional designs. An interior partition, extending longitudinally within the tank, serves to divide the tank into a filter basin area and a filtrate channel area. In addition, a unique underdrain system is provided which comprises a plurality of pipe headers arranged in parallel, between the interior partition and one side wall of the tank, transversely of the length of the tank. Each underdrain header is formed with a plurality of openings or slots along its length, arranged in a suitable pattern to insure uniformity of flow. Each header has a closed end remote from the interior partition, and an open end within the interior partition which is adapted to transfer filtered water to the filtrate channel during dosing, but which is also adapted to be engaged by the discharge of a backwash pump supported from the travelling bridge of the unit during backwashing. Filtration media substantially fills the cell from the bottom wall or floor of the tank, with the understanding that the underdrain manifolds or headers provide some degree of filter media support. The headers themselves are structural tubular members which are supported at opposite ends within the one side wall and the interior partition but otherwise require no additional support, thereby eliminating the need for individual cell dividers. In the exemplary embodiment, the travelling bridge supports a backwash hood movable along the length of the filter basin, in continuous movement or in stepwise fashion, to backwash successive portions of the filter bed. The hood supports a backwash removal header which serves to remove backwash material from the upper area of the filter bed, optionally assisted by an additional wash water pump.

Thus, in accordance with the broader aspects of the invention, there is provided in a travelling bridge filtration apparatus wherein a downflow filtration bed including one or more layers of filter media located in a tank is periodically backwashed by backwash means secured to a bridge adapted to travel across the top of the tank, the backwash means including a backwash pump, a backwash hood, and wherein the tank includes a filtrate channel for removing filtered effluent from the tank, an improvement comprising an underdrain comprised of a plurality of headers within the bed and in communication with the filtrate channel, each header provided with a plurality of apertures along its length.

Further details and advantages of the invention will become apparent from the detailed description which follows.

DETAILED DESCRIPTION OF THE DRAWINGS

Figure 1:
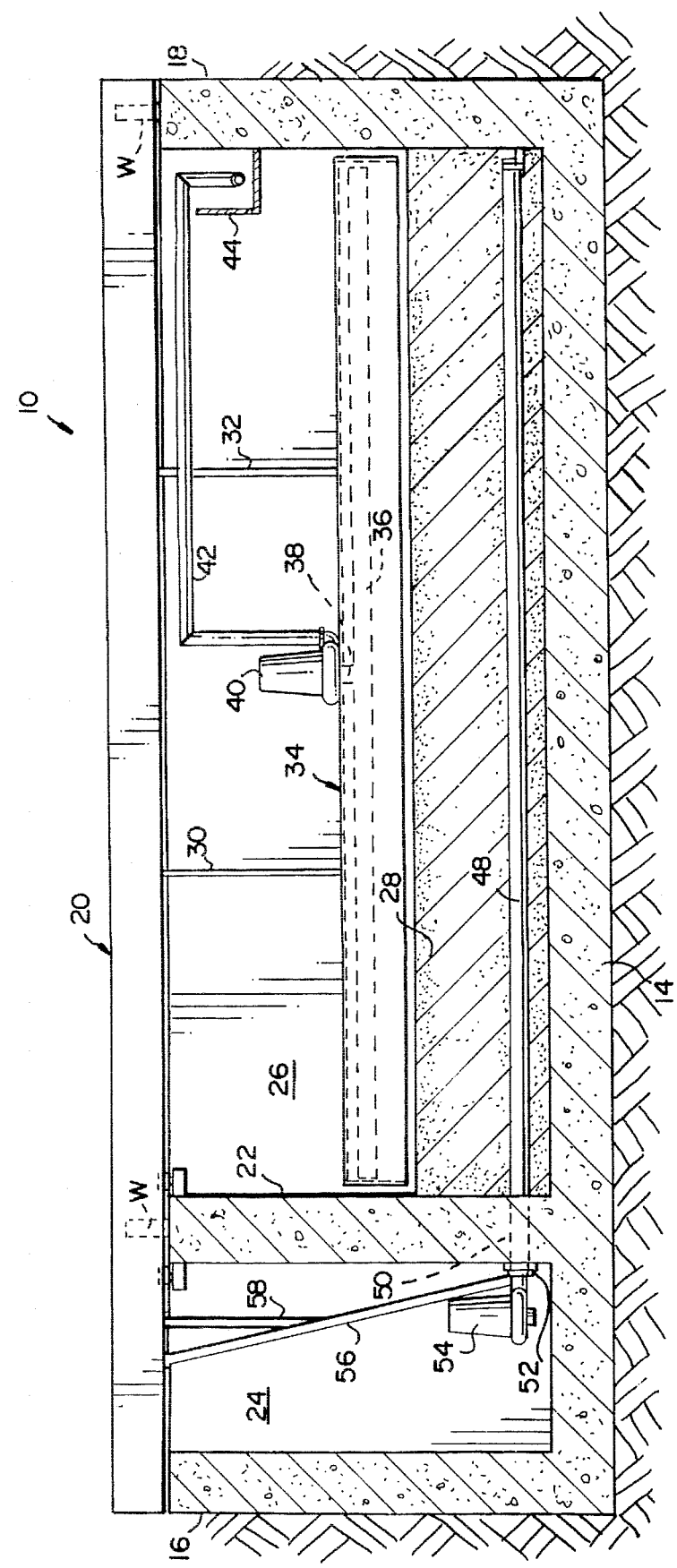
FIG. 1 is a cross section taken through a travelling bridge filtration unit in accordance with this invention.

With reference now to FIG. 1, a travelling bridge backwash system 10 is shown to include a tank 12 of concrete (or steel) construction consisting of a bottom wall or floor 14, a pair of side walls 16, 18, and a pair of end walls (not shown). A travelling bridge 20 (illustrated essentially schematically for the sake of simplicity and convenience with many of its conventional components omitted), is mounted atop the device for movement along the tank via wheels W, in a direction parallel to the side walls 16, 18 and in the longitudinal direction of the tank. The manner in which the bridge 20 is mounted and its associated drive are conventional in the art and form no part of this invention.

The tank 12 also includes an interior partition 22, in proximity to the side wall 16 and extending parallel thereto, along the length of the tank between the end walls. This partition 22 serves to divide the tank into a relatively large filter basin 26 and a relatively smaller filtrate channel 24.

The filter basin 26 is provided with a bed 28 of filter media which may comprise one or more layers of granular material, conventionally used in gravity type filtration systems. In this first exemplary embodiment, the filter basin is configured as a single filter cell (also shown in FIG. 8), without the conventional dividers which are otherwise used to divide the filter basin into a plurality of individual cells (running parallel to the end walls, transversely between partition 22 and side wall 18). FIG. 9 shows an alternative arrangement where cell dividers 29 are used to form individual cells 29A. As already noted, however, these dividers need not be structural in nature since they have no structural supporting function vis-a-vis the underdrain headers, as described below.

Suspended from the bridge by struts 30, 32 is a backwash hood 34 which also extends transversely of the tank, substantially between the partition 22 and side wall 18 and in close proximity to the bed 28. The hood encloses a backwash header 36 which is connected to an inlet 38 of a wash water pump 40 mounted externally of the hood 34. The discharge conduit 42 runs to a backwash trough 44 fixed to the inside of side wall 18 and also running the length of the tank. In this way, the discharge outlet 42 can travel freely within the trough 44 as the bridge 20 travels the length of the tank 12. It will be appreciated that the pump 40 may also be mounted on the bridge 20. It will also be appreciated that the hood 34 is also mounted for vertical movement (by any suitable means) toward and away from the bed 28, for reasons provided further below.

Figure 8:
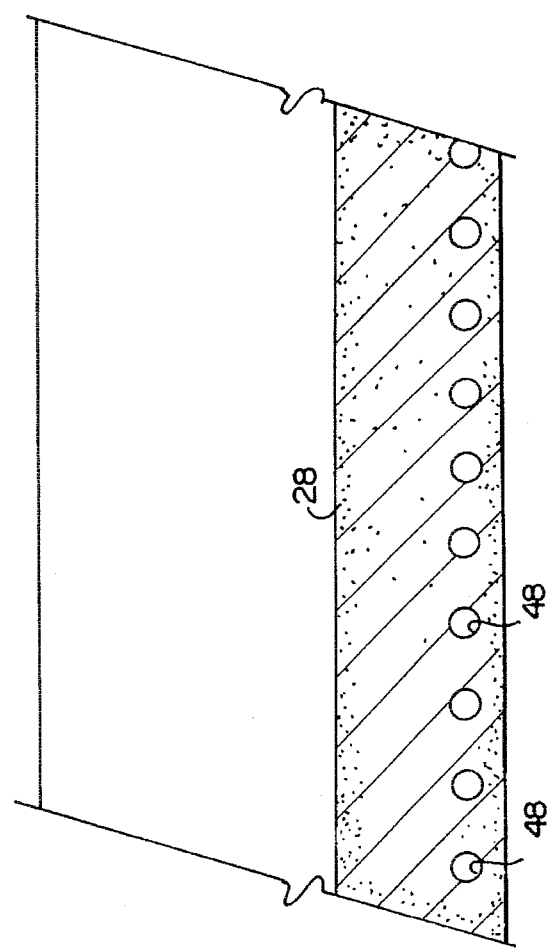
FIG. 8 is a partial side section of the travelling bridge filtration unit illustrated in FIG. 1.
Figure 9:
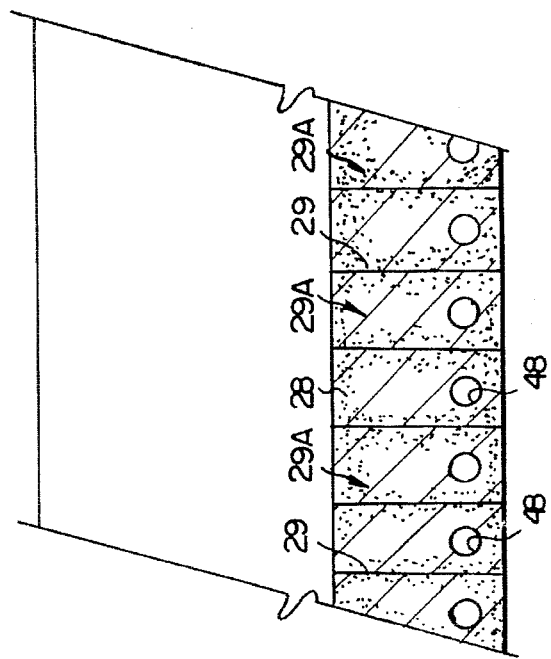
FIG. 9 is a view similar to FIG. 8 but in accordance with another exemplary embodiment of the invention, where the filtration basin is divided into a plurality of individual filter cells.

Within the filter media bed 28, and in proximity to the bottom wall or floor 14, there are arranged a plurality of underdrain pipe headers 48 which, as best seen in FIGS. 1 and 8 extend in laterally spaced relationship at a substantially uniform height within the filter bed media. Each tubular manifold or pipe header 48 is supported at opposite ends by the side wall 18 and partition 22 by suitable means. Thus, it will be appreciated that the manifolds extend transversely of the filter basin length, and parallel with the hood 34.

The end of each header 48 closest the side wall 18 is closed, while the opposite end opens through the partition 22 at a port 50. The port 50 of each header is designed to be engaged, one at a time, with an inlet 52 of a main backwash pump 54. The latter is secured to the bridge 20 by braces 56, 58 for movement therewith along the length of the tank 12 adjacent the partition 22. The backwash pump discharge 52 is sealingly engageable with the individual ports 50, in succession, as the pump is moved either continuously or stepwise with the backwash hood 34 along the length of the tank by the travelling bridge.

Figure 2:
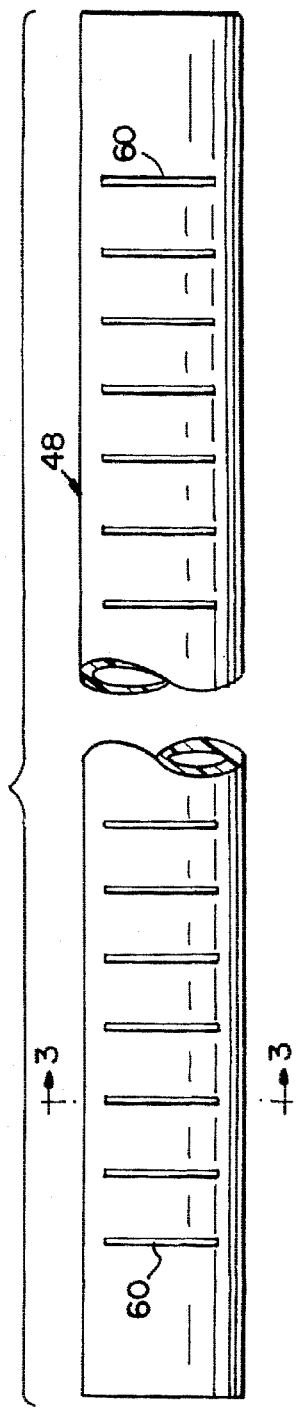
FIG. 2 is a plan view of an underdrain manifold or header of the type included in FIG. 1.
Figure 5:
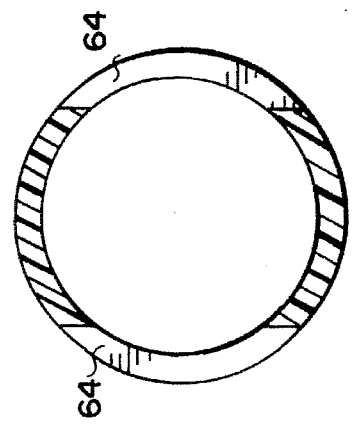
FIG. 5 is a cross section through an underdrain header in accordance with another exemplary embodiment of the invention.
Figure 4:
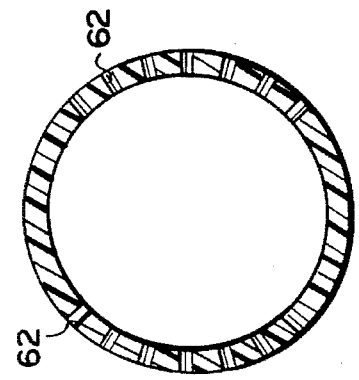
FIG. 4 is a cross section of an underdrain header in accordance with an alternative embodiment of the invention.
Figure 3:
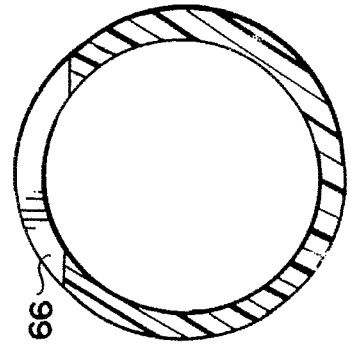
FIG. 3 is a cross section taken along line 3—3 of FIG. 2.
Figure 6:
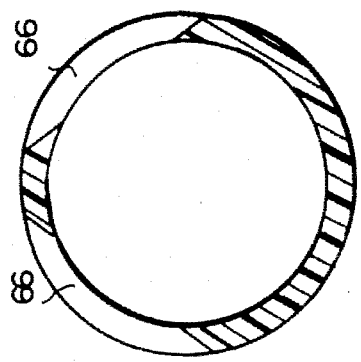
FIG. 6 is a cross section through a tubular underdrain header in accordance with yet another embodiment of the invention.
Figure 7:
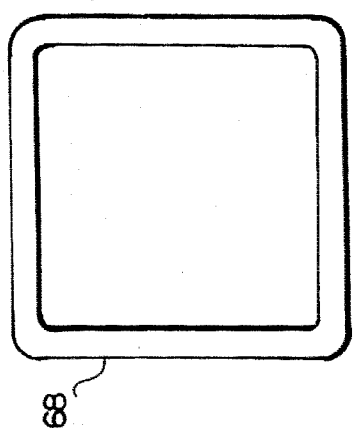
FIG. 7 is an end view illustrating an alternative cross sectional shape for the underdrain header in accordance with another embodiment of the invention.

With reference now to FIGS. 2 and 3, it will be seen that each pipe header 48 is formed with a plurality of slots 60, spaced along one side of the manifold. Alternative aperture designs are illustrated in FIGS. 4, 5 and 6. In FIG. 4, holes 62 are spaced about the periphery of the header, and also extend along the length of the header. In FIG 5, opposed slots 64 are formed along the length of the header, while in FIG. 6, similar slots 66 are shown, but with an angular offset one relative to the other. It is noted that while FIGS. 2–6 illustrate a round header, other suitable cross-sectional shapes, such as (but not limited to) the square header shown at 68 in FIG. 7 may also be employed. In all cases, the orifices or slots formed in the header should be sized and spaced based upon hydraulic design criteria (including uniformity of flow across the width of the tank) and desired media grain size retention.

In use, the travelling bridge filtration system as described above will operate in the dosing mode in the usual manner of downflow gravity type filtration systems. Thus, influent will be introduced into the tank uniformly from above, and will flow downwardly through the filter bed 28 and into the filtrate channel 24 via underdrain headers 48. To effect periodic backwashing of the filtration bed, the backwash hood 34 will be moved continuously or indexed stepwise across the bed by the bridge 20. At each successive area, the backwash pump 54 will be actuated to pump filtrate from the chamber 24 via the underlying header 48 upwardly into the localized area of the filter bed 28 in a direction counter to the normal direction of filtration. As a result of the close proximity of the backwash hood 34 to the filter bed 28, (achieved by a conventional mechanical device to raise and lower the hood, or by maintaining the backwash hood at a level immediately adjacent the level of the filter media) backwash debris and liquid will enter the backwash hood 34 and the backwash discharge header 36. Backwash effluent will be discharged into the backwash trough 44 by means of the discharge pipe 42, with assistance from the waste water pump 40. In the first described exemplary embodiment, where no individual cell dividers are utilized, the backwash hood and backwash header arrangement are sufficient to effect backwash of localized portions of the bed 28 even though individual cell plenums are not formed by vertical cell dividers.

For that embodiment where individual cell dividers 29 (FIG. 9) are utilized to form individual cells 29A, the backwash hood will be indexed from cell to cell and will move downwardly into sealing engagement with the upper edges of successive pairs of partitions 29 in the manner described, for example, in commonly assigned U.S. Pat. No. 4,859,330, incorporated herein by reference. In other words, after horizontal indexing to a cell 29A, the backwash hood 34 will be moved downwardly to sealingly engage the cell dividers forming that cell. After backwash, the hood 34 will move upwardly out of sealing engagement with the cell 29A and will then be horizontally indexed to the next adjacent cell. For this embodiment, wash water pump 40 may be omitted altogether with backwash effected solely by the backwash pump 54. It is important to recognize, however, that because the structural backwash headers 48 do not require any support from individual cell dividers, these dividers may be omitted altogether. In either case, normal filtration may continue in areas on either side of the localized portion of the filter bed being backwashed.

Finally, it should be noted that existing designs utilizing porous underdrain plates typically require about 11 inches head room from the basin floor to the top of the underdrain plate. Eleven inches of filter sand is then installed on the underdrain plate. Due to stack-up elevations of the backwash mechanism, the minimum operating water level from the basin floor to the water surface becomes 3 feet 3 inches. With the underdrain design in accordance with this invention, the distance from the basin floor 14 to the top of the underdrain headers 48 can be reduced to 7 inches. With the addition of 11 inches of sand and sufficient water level for equipment operation, the minimum operating water level becomes 2 feet 11 inches. This reduction in overall head requirements becomes significant in retrofit applications where a filter system must be installed in an existing treatment plant with very little room in the hydraulic profile.

While the invention has been described in connection with that is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a travelling bridge filtration apparatus including a tank having a pair of side walls, a pair of end walls and a floor, and wherein a downflow filtration bed including one or more layers of filter media located in the tank is periodically backwashed by backwash means secured to a bridge adapted to travel across the top of the tank, the backwash means including a backwash pump, a backwash hood and enclosed waste water removal manifold, and wherein the tank includes a filtrate channel for removing filtered effluent from the tank, the improvement wherein said filtration bed is not partitioned and wherein said one or more layers of filter media are supported directly on said floor of the tank, and wherein an underdrain is provided which comprises a plurality of hollow, tubular pipe headers extending in horizontally spaced relationship through said bed and supported only at opposite ends thereof by said side walls such that each tubular pipe header is in communication with said filtrate channel; each tubular pipe header provided with a plurality of apertures along its length; and further wherein said backwash pump is selectively engageable with each of said plurality of hollow tubular pipe headers.

2. The travelling bridge filtration apparatus of claim 1 wherein apertures in said plurality of headers are sized in accordance with filter media grain size.

3. The travelling bridge filtration apparatus of claim 1 wherein said plurality of headers is located within said bed but spaced above said floor of said tank.

4. The travelling bridge filtration apparatus of claim 1 wherein each of said headers is provided with a plurality of apertures along at least one side thereof.

5. The travelling bridge filtration apparatus of claim 1 wherein each of said headers is provided with a plurality of apertures along opposite sides thereof.

6. The travelling bridge filtration apparatus of claim 1 wherein said plurality of apertures are located along an upper half of the header and on either side of a vertical centerline passing therethrough.

7. The travelling bridge filtration apparatus of claim 1 wherein said filtration bed comprises about 11 inches of filter media supported on a floor of said tank and wherein a vertical distance between the floor and tops of said headers is about 7 inches.

8. The travelling bridge filtration apparatus of claim 1 wherein said backwash pump is suspended from said bridge and located within said filtrate channel for movement with said bridge, said pump being sequentially engageable with an open end of each of said plurality of headers for supplying filtrate to said bed in an upward direction for backwashing said bed.

9. The travelling bridge filtration apparatus of claim 1 and including a waste water pump in proximity to said backwash hood for removal of backwash water from said hood.

10. The travelling bridge filtration apparatus of claim 1 wherein said backwash pump is the sole means for effecting backwash.

11. Travelling bridge filtration apparatus comprising an open top tank having a floor, side walls and an interior partition dividing the tank into a filtration basin and a filtrate channel, said filtration basin having a filter media bed therein supported directly on said floor and adapted to receive influent from above the bed; a plurality of tubular, underdrain pipe headers extending across and through the bed between the side walls of the tank, in vertically spaced relationship with the floor of said tank, each pipe header supported at opposite ends thereof by said side walls, and provided with a plurality of apertures enabling filtrate flowing in a downward direction through said bed to enter said pipe headers, each pipe header communicating with said filtrate channel thereby enabling filtrate to pass into said filtrate channel; travelling bridge means mounted on the open top of the tank for movement along the tank, the bridge having a backwash hood suspended therefrom and adapted to pass along the bed in the filtration basin in close proximity thereto, said backwash hood having a waste manifold therein connected to a wash water pump adapted to remove backwash waste from said hood, said bridge also having a backwash pump suspended therefrom within said filtrate channel, said backwash pump including discharge means engageable sequentially with each said pipe header, thereby enabling pumping of filtrate through said plurality of pipe headers and into said bed in an upward direction to backwash successive portions of said bed.

12. The travelling bridge filtration apparatus of claim 11 wherein said filtration bed comprises about 11 inches of filter media supported on a floor of said tank and wherein a vertical distance between the floor and tops of said headers is about 7 inches.

13. The travelling bridge filtration apparatus of claim 11 wherein said downflow filtration bed is divided into a plurality of individual filter cells by a plurality of non-structural interior partitions, each filter cell including one of said plurality of headers.

14. The travelling bridge filtration apparatus of claim 11 wherein apertures in said plurality of headers are sized in accordance with filter media grain size.

15. The travelling bridge filtration apparatus of claim 11 wherein each of said headers is provided with a plurality of apertures along one side thereof.

16. The travelling bridge filtration apparatus of claim 11 wherein each of said headers is provided with a plurality of apertures along opposite sides thereof.

17. The travelling bridge filtration apparatus of claim 11 wherein each of said headers is provided with a plurality of apertures along an upper half of the header and on either side of a vertical centerline passing therethrough.

18. A travelling bridge filtration unit comprising:

a tank having a floor, a pair of side walls and a pair of end walls defining a rectangular tank having an open top; an interior partition wall in the tank extending lengthwise between said pair of end walls to thereby form a filtrate channel between the interior partition wall and one of said pair of side walls, and a filter basin between the interior partition and the other of said pair of said walls; a bed of filter media in said filter basin supported directly on said floor of the tank; wherein said bed is divided into a plurality of individual filter cells by a plurality of non-structural interior partitions; a travelling bridge mounted on the tank for movement therealong in a lengthwise direction, said travelling bridge supporting a backwash hood for movement across said filter basin in close proximity to said bed and movable into and out of sealing engagement with each of said individual filter cells, and a backwash pump for corresponding movement in said filtrate channel; a plurality of underdrain pipe headers extending between and supported only by said interior partition wall and said other of said pair of side walls above said floor, and arranged so that one of said plurality of pipe headers is located in each filter cell, said pipe headers having closed ends adjacent said other of said side walls, and open ends extending through said interior partition wall in communication with said filtrate channel, said underdrain pipe headers each further including a plurality of apertures formed along the length thereof so that filtrate flowing down through said filter media can be discharged via said pipe headers to said filtrate channel; and wherein said backwash pump is connectable in sequence to each pipe header so that successive portions of said bed of filter media can be backwashed with filtrate flowing up through said filter media and removed via said backwash hood.

19. The unit of claim 18 wherein said backwash hood supports a waste water pump connected at an inlet end to a backwash discharge manifold extending within said hood, and at an outlet end to a discharge conduit extending to a backwash trough fixed to said tank.

20. The unit of claim 18 and including a waste water pump in proximity to said backwash hood for removal of backwash water from said hood.

21. The unit of claim 18 wherein said backwash pump is the sole means for effecting backwash.

* * * * *